(12) United States Patent
Gomez

(10) Patent No.: US 12,350,814 B1
(45) Date of Patent: Jul. 8, 2025

(54) TOOL FOR PICKING UP SOAP FROM A SHOWER

(71) Applicant: Alfredo S Gomez, Miami, FL (US)

(72) Inventor: Alfredo S Gomez, Miami, FL (US)

( * ) Notice: Subject to any disclaimer, the term of this patent is extended or adjusted under 35 U.S.C. 154(b) by 0 days.

(21) Appl. No.: 19/060,242

(22) Filed: Feb. 21, 2025

(51) Int. Cl.
*B25J 1/04* (2006.01)
*A47K 17/00* (2006.01)

(52) U.S. Cl.
CPC ............... *B25J 1/04* (2013.01); *A47K 17/00* (2013.01)

(58) Field of Classification Search
CPC .................................. B25J 1/04; A47K 17/00
USPC .......................................................... 294/1.4
See application file for complete search history.

(56) References Cited

U.S. PATENT DOCUMENTS

| | | | | |
|---|---|---|---|---|
| 3,804,448 A * | 4/1974 | Schmieler | ............. | E01H 1/1206 D30/162 |
| 5,031,948 A * | 7/1991 | Groth | ................. | B65B 67/1233 248/101 |
| 5,738,400 A * | 4/1998 | Chambless | ............ | A01K 77/00 294/209 |
| 8,684,429 B1 * | 4/2014 | Holub | ................... | E01H 1/1206 294/1.4 |
| 9,790,654 B2 * | 10/2017 | Gordon | ....................... | A47L 5/12 |
| 10,006,180 B2 * | 6/2018 | Weber | ....................... | B65F 1/10 |
| 10,465,351 B1 * | 11/2019 | Perez | .................... | E01H 1/1206 |
| 10,577,765 B2 * | 3/2020 | Fulbrook | ............... | E01H 1/1206 |
| 10,897,875 B2 * | 1/2021 | Jimenez | ................ | A01K 23/005 |
| 2013/0249224 A1 * | 9/2013 | Ng | ......................... | E01H 1/1206 294/1.4 |

* cited by examiner

*Primary Examiner* — Stephen A Vu
(74) *Attorney, Agent, or Firm* — Huben Alcoba, Esq.

(57) ABSTRACT

A tool for picking up soap from a shower that is designed to enhance safety and convenience by preventing the need to bend down in wet and slippery conditions. The tool comprises a handle with a telescopic tubular assembly for adjustable reach, a rectangular frame supporting a mesh net, and a wedge-shaped scoop for efficiently lifting soap. The mesh net securely holds the soap, preventing it from slipping out, while the wedge-shaped scoop aids in guiding the soap into the net. The tool also includes a ring and a closed-loop rope for easy storage. The invention aims to reduce the risk of falls, improve accessibility, and provide an effective soap retrieval mechanism. Its lightweight, durable, and ergonomic design makes it an essential aid for individuals with limited mobility, ensuring a safer and more convenient shower experience.

5 Claims, 1 Drawing Sheet

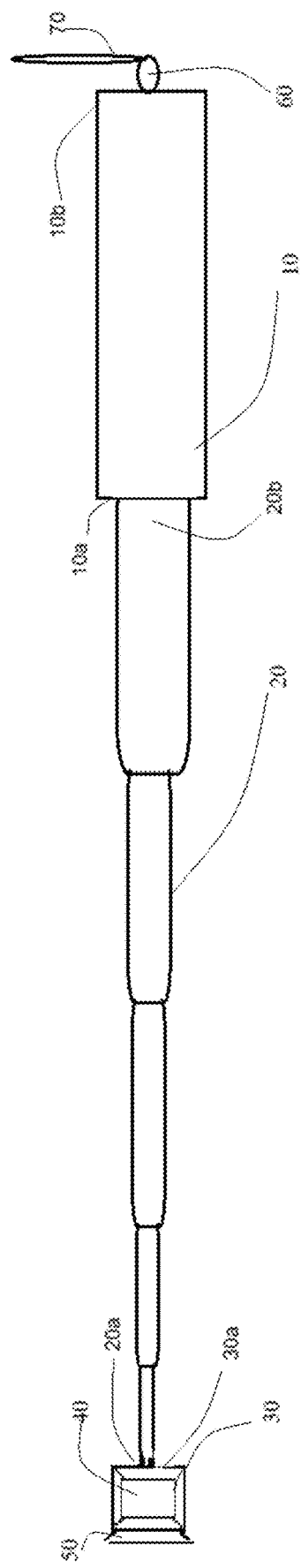
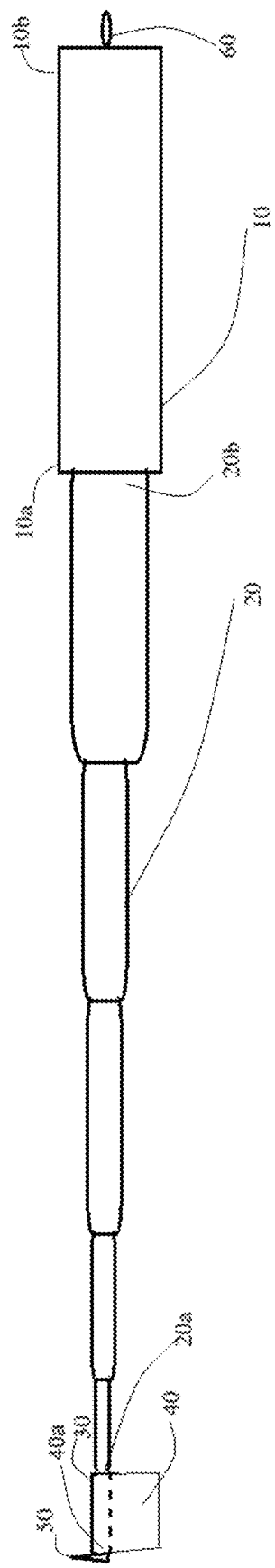
Fig. 1
Fig. 2

TOOL FOR PICKING UP SOAP FROM A SHOWER

BACKGROUND

Field of the Invention

The present invention relates to tools for retrieving objects from the floor, and more particularly to a tool specifically designed for picking up soap in a shower environment.

Description of the Related Art

Dropping soap while showering is a common inconvenience, particularly for individuals with limited mobility, including the elderly, individuals with disabilities, or those recovering from injuries. Traditional methods of retrieving soap, such as bending or crouching, can pose significant safety risks, including slips and falls due to the wet and slippery nature of the shower floor.

Several tools and devices have been developed to aid in picking up objects from the floor, such as grabbers and reach extenders. However, these devices are generally designed for dry environments and lack the structural features necessary for efficiently retrieving slippery, compact objects such as soap. Conventional gripping tools rely on rigid mechanical jaws, suction mechanisms, or adhesive properties, which are ineffective for handling wet and slippery soap bars.

Therefore, there remains a need for a specialized tool that allows users to easily and securely pick up soap from the shower floor without requiring excessive bending or reaching. The present invention provides an improved soap retrieval tool that overcomes the limitations of conventional reach extenders by incorporating a mesh net and wedge-shaped scoop for efficiently capturing and lifting the soap. Additionally, the telescopic design allows for adjustable length, making it versatile for users of different heights and mobility levels.

SUMMARY

The present invention provides a tool for picking up soap from a shower, specifically designed to help users retrieve dropped soap without the need to bend down, reducing the risk of slips and falls. The tool is particularly beneficial for individuals with limited mobility, including elderly users and those with physical disabilities.

The tool comprises a handle with a telescopic tubular assembly, allowing for adjustable length to accommodate different users and shower setups. The telescopic assembly connects to a rectangular frame, which provides structural support for a mesh net designed to capture and secure the soap. A wedge-shaped scoop is attached to an upper first end of the mesh net, enabling users to easily slide the tool under the soap and lift it efficiently.

An object of the present invention is to enhance safety by providing a specialized tool that eliminates the need to bend down in a wet and slippery shower environment, the invention helps prevent dangerous falls and injuries, especially for the elderly and individuals with mobility impairments.

In addition, the present invention aims to achieve the following objectives: 1. To enhance safety by providing a specialized tool that eliminates the need to bend down in a wet and slippery shower environment, the invention helps prevent dangerous falls and injuries, especially for the elderly and individuals with mobility impairments; 2. To provide an effective soap retrieval mechanism that is unlike conventional reach extenders that rely on mechanical gripping, the combination of a mesh net and wedge-shaped scoop ensures secure and efficient soap retrieval, even in wet and slippery conditions. The mesh net provides flexibility, allowing soap of various sizes and shapes to be lifted without slipping out.

The present invention provides a lightweight, durable, and easy-to-use solution for safely retrieving soap from a shower floor. Its adjustable reach, secure gripping mechanism, and storage-friendly design make it a valuable tool for individuals of all ages and physical abilities.

BRIEF DESCRIPTION OF THE DRAWINGS

These and other features, aspects, and advantages of the present invention will become better understood with regards to the following description, appended claims, and drawings where:

FIG. 1 is a top view of the present invention; and

FIG. 2 is a side view of the present invention.

DESCRIPTION

As seen in FIGS. 1-2, the present invention is a tool for picking up soap from a shower. The tool comprises a handle 10 that has a first end 10a and second end 10b. A telescopic tubular assembly 20 that has a first end 20a and a second end 20b, the second end 20b attaches to the first end of the handle 10a. A rectangular frame 30, the first end 20a of the telescopic tubular assembly 20 attaches to a central position 30a of the rectangular frame 30. A mesh net 40 that mounts on the rectangular frame 30. And, a wedge-shaped scoop 50 that attaches to an upper first end of the mesh net.

In an embodiment of the present invention, the tool comprises a ring 60 that is attached to the second end 10b of the handle 10.

In another embodiment of the present invention, the tool comprises a closed loop rope 70 that attaches to the ring 60.

In a preferred embodiment of the present invention, the rectangular frame measures at least three inches in width and at least three inches in length, the telescopic tubular assembly measures from at least twenty-four inches in length, and the handle measures at least four inches in length.

The embodiments of the tool for picking up soap from a shower described herein are exemplary and numerous modifications, combinations, variations, and rearrangements can be readily envisioned to achieve an equivalent result, all of which are intended to be embraced within the scope of the appended claims. Further, nothing in the above-provided discussions of the tool for picking up soap from a shower should be construed as limiting the invention to an embodiment or a combination of embodiments. The scope of the invention is defined by the description, drawings, and claims.

What is claimed is:

1. A tool for picking up soap from a shower, the tool comprising:

a handle that has a first end and a second end;

a telescopic tubular assembly that has a first end and a second end, the second end attaches to the first end of the handle;

a rectangular frame, the first end of the telescopic tubular assembly being fixedly attached to a central position of the rectangular frame without intervening pivot points between said rectangular frame and said telescopic tubular assembly;

a mesh net that mounts on the rectangular frame; and a wedge-shaped scoop attached to an upper first end of said mesh net, wherein said mesh net is supported by said rectangular frame such that said mesh net positions said wedge-shaped scoop to slide under an object on a surface.

2. The tool for picking up soap from the shower of claim 1, wherein the tool comprises a ring that is attached to the second end of the handle.

3. The tool for picking up soap from the shower of claim 2, wherein the tool comprises a closed loop rope that attaches to the ring.

4. The tool for picking up soap from the shower of claim 3, wherein the tool further comprises an eyelet on the handle, and wherein the tool comprises a closed loop rope that attaches to the eyelet.

5. The tool for picking up soap from the shower of claim 4, wherein the rectangular frame measures at least three inches in width and at least three inches in length, the telescopic tubular assembly measures at least twenty-four inches in length, and the handle measures at least four inches in length.

\* \* \* \* \*